(12) United States Patent
Carino et al.

(10) Patent No.: US 8,730,847 B1
(45) Date of Patent: May 20, 2014

(54) CONFERENCING USING A MOBILE DEVICE

(75) Inventors: Eric Carino, Santa Clara, CA (US);
Sachin Shukla, Santa Clara, CA (US)

(73) Assignee: ShoreTel, Inc., Sunnyvale, CA (US)

( * ) Notice: Subject to any disclaimer, the term of this patent is extended or adjusted under 35 U.S.C. 154(b) by 232 days.

(21) Appl. No.: 13/341,585

(22) Filed: Dec. 30, 2011

(51) Int. Cl.
*H04L 12/16* (2006.01)

(52) U.S. Cl.
USPC ...................................... 370/260; 379/202.01

(58) Field of Classification Search
None
See application file for complete search history.

(56) References Cited

U.S. PATENT DOCUMENTS

| | | | | |
|---|---|---|---|---|
| 8,112,071 | B2 * | 2/2012 | Joglekar ....................... | 455/416 |
| 8,249,571 | B2 * | 8/2012 | Jacobstein et al. ............ | 455/416 |
| 8,346,231 | B1 * | 1/2013 | Smith et al. ................... | 455/416 |
| 8,600,027 | B1 * | 12/2013 | Doerr et al. .............. | 379/202.01 |
| 2010/0183129 | A1 * | 7/2010 | Lindblad et al. ........... | 379/93.01 |
| 2011/0142235 | A1 * | 6/2011 | Leigh et al. .................... | 380/247 |
| 2012/0003983 | A1 * | 1/2012 | Sherlock et al. .............. | 455/450 |
| 2013/0143539 | A1 * | 6/2013 | Baccay et al. ................ | 455/416 |

\* cited by examiner

*Primary Examiner* — Anh-Vu Ly
*Assistant Examiner* — Hashim Bhatti
(74) *Attorney, Agent, or Firm* — Kilpatrick Townsend & Stockton LLP

(57) ABSTRACT

A method for joining a conference using a mobile device includes receiving an invitation at the mobile device. The invitation includes a link associated with a conference bridge and a first identifier of the conference. The method also includes activating the link in the invitation, sending the first identifier of the conference from the mobile device to the conference bridge, and receiving a redirect message at the mobile device from the conference bridge. The redirect message is associated with a conferencing application on the mobile device and includes a second identifier of the conference. The method also includes launching the conferencing application on the mobile device and sending the second identifier of the conference from the mobile device to the conference bridge to establish the conference between the conference bridge and the conferencing application via the mobile device.

25 Claims, 6 Drawing Sheets

CONFERENCING USING A MOBILE DEVICE

FIELD OF THE INVENTION

The present invention relates generally to conferencing using a mobile device and more particularly to methods of joining a conference call using a mobile device.

BACKGROUND

Conference calls allow multiple participants to join a telephone call and may involve the sharing of audio, video, and/or web resources. A conference call may also be referred to as a teleconference. Scheduling conference calls, joining conference calls, participating in conference calls, and the like, can be broadly referred to as conferencing.

Conferencing has become especially important for businesses as it enables them to reduce travel costs by allowing workers from different locations to participate in meetings. A typical business conference call may include an audio call that is coordinated with sharing of a presentation or document via the Internet or another computer network. The audio portion of the call may be carried over a conventional public switched telephone network (PSTN) and/or through the use of a voice over Internet Protocol (VoIP) service. Other resources such as video and web are typically provided via a computer network such as the Internet. In most systems the management of these resources is performed by a conference bridge. A conference bridge is a machine that links telephone calls and enables the sharing of other resources (e.g., video and/or web). The conference bridge may also provide other conferencing services such as audio and/or video recording.

Although there are many different conferencing systems and many different ways to join or participate in a conference call, a typical scheduled conference call includes an assignment of a conference ID and an assignment of one or more access codes by a conference bridge. The conference ID is used by the conference bridge to identify the conference. The access codes are used in a manner analogous to passwords. Different access codes may be used to control different access levels or privileges. The conference ID and one or more access codes are typically provided to each participant that is invited to participate in a conference call. At the scheduled time, each participant may call-in to the conference bridge and provide the conference ID and access code. The conference bridge verifies the information and then connects the participant to the identified conference call.

Due to the increasing importance of conferencing, methods are continuously desired to improve conferencing services and enhance user experience.

SUMMARY

Embodiments of the present invention enable participants to join conference calls with minimal time and effort when using a mobile device. Using some embodiments, for example, a participant may join a conference call by merely clicking on a hyperlink in a conference invitation. Clicking on the hyperlink (or selecting the hyperlink using a touchscreen) may provide a conference ID and an access code to a conference bridge and provide means for launching a conferencing application on the mobile device and establishing the conference. This is in contrast to conventional techniques that typically require a participant to manually launch a conferencing application on the mobile device, call-in to a conference bridge, and enter a conference ID and an access code using a keypad or similar input device. Details of various embodiments of the invention are described below.

In accordance with an embodiment of the invention, a method for joining a conference using a mobile device, where the conference utilizes resources provided by a conference bridge, includes receiving an invitation at the mobile device to join the conference. The invitation includes a hyperlink associated with an Internet Protocol (IP) address of the conference bridge and an identifier of the conference. The method also includes selecting the hyperlink in the invitation using an input device and, in response to selecting the hyperlink, launching a web browser on the mobile device and sending the identifier of the conference from the mobile device to the conference bridge using the IP address. The method also includes receiving the identifier of the conference at the conference bridge and determining at the conference bridge that the identifier was sent from a mobile communications device. The determination is made using information from a user agent header. The method also includes sending a redirect message from the conference bridge to the mobile device. The redirect message specifies a conferencing application on the mobile device and includes an access code for the conference. The method also includes receiving the redirect message at the mobile device, providing the redirect message to the web browser on the mobile device, providing the redirect message from the web browser to an operating system on the mobile device, and launching the conferencing application on the mobile device in response to instructions from the operating system. The method also includes providing the access code to the conferencing application, sending the access code from the conferencing application to the conference bridge using the mobile device, and establishing the conference between the conference bridge and the conferencing application via the mobile device.

In accordance with another embodiment of the invention, a method for joining a conference using a mobile device, where the conference utilizes resources provided by a conference bridge, includes receiving an invitation at the mobile device to join the conference. The invitation includes a link associated with the conference bridge and a first identifier of the conference. The method also includes activating the link in the invitation and, in response to activating the link, sending the first identifier of the conference from the mobile device to the conference bridge. The method also includes receiving the first identifier of the conference at the conference bridge and determining at the conference bridge that the first identifier of the conference was sent from a mobile communications device. The determination is made using information from a user-agent header. The method also includes sending a redirect message from the conference bridge to the mobile device. The redirect message is associated with a conferencing application on the mobile device and includes a second identifier of the conference. The method also includes receiving the redirect message at the mobile device and, in response to receiving the redirect message, launching the conferencing application on the mobile device. The method also includes sending the second identifier of the conference from the mobile device to the conference bridge and establishing the conference between the conference bridge and the conferencing application via the mobile device.

In an embodiment, the link is a hyperlink. In another embodiment, the link is a uniform resource identifier (URI).

In an embodiment, the mobile device is a tablet computer. In another embodiment, the mobile device is a mobile phone.

In another embodiment, the first identifier of the conference includes a conference ID and the second identifier of the conference includes an access code.

In another embodiment, the method includes launching a web browser on the mobile device in response to activating the link in the invitation. The web browser sends the first identifier of the conference to the conference bridge.

In yet another embodiment, the redirect message is received at the mobile device by the web browser and passed from the web browser to an operating system running on the mobile device. The operating system provides instructions to launch the conferencing application on the mobile device.

In accordance with another embodiment of the invention, a method for joining a conference using a mobile device, where the conference utilizes resources provided by a conference bridge, includes receiving an invitation at the mobile device to join the conference. The invitation including a link associated with the conference bridge and a first identifier of the conference. The method also includes activating the link in the invitation, sending the first identifier of the conference from the mobile device to the conference bridge, and receiving a redirect message at the mobile device from the conference bridge. The redirect message is associated with a conferencing application on the mobile device and includes a second identifier of the conference. The method also includes, in response to receiving the redirect message, launching the conferencing application on the mobile device and sending the second identifier of the conference from the mobile device to the conference bridge to establish the conference between the conference bridge and the conferencing application via the mobile device.

In an embodiment, the mobile device is an Apple iPhone.

In another embodiment, the link includes an Internet Protocol (IP) address of the conference bridge. In another embodiment, the link includes a domain name associated with the conference bridge.

In another embodiment, the redirect message is received at the mobile device by the web browser and passed from the web browser to an operating system running on the mobile device. The operating system provides instructions to launch the conferencing application on the mobile device.

In another embodiment, the invitation is received via at least one of an email message, a calendar event, a short message service (SMS) message, or an instant messaging (IM) message.

In yet another embodiment, the link is activated in response to user input received via an input device.

In accordance with another embodiment of the invention, a method for establishing a conference using a conferencing application on a mobile device, where the conference utilizes resources provided by a conference bridge, includes receiving a first identifier of the conference at the conference bridge. The first identifier is sent from the mobile device in response to activating a link in a conference invitation. The method also includes determining at the conference bridge that the first identifier of the conference was sent from a mobile communications device. The determination is made using information from a user agent header. The method also includes sending a redirect message from the conference bridge to the mobile device. The redirect message is associated with a conferencing application on the mobile device and includes a second identifier of the conference. The method also includes receiving the second identifier of the conference from the mobile device and establishing the conference with the conferencing application via the mobile device.

In accordance with another embodiment of the invention, a method for joining a conference using a mobile device, where the conference utilizes resources provided by a conference bridge, includes receiving an invitation at the mobile device to join the conference. The invitation includes a link associated with a redirect message. The redirect message is associated with a conferencing application on the mobile device and an identifier of the conference. The method also includes activating the link in the invitation and passing the redirect message from a web browser to an operating system running on the mobile device. The method also includes providing instructions from the operating system to launch the conferencing application on the mobile device. The method also includes launching the conferencing application on the mobile device, providing the identifier of the conference to the conferencing application, sending the identifier of the conference from the mobile device to the conference bridge, and establishing the conference between the conference bridge and the conferencing application via the mobile device.

In an embodiment, the identifier of the conference includes an identifier associated with the conference bridge, a conference ID, and an access code for the conference.

In accordance with another embodiment of the invention, a method for establishing a conference with a conferencing application on a mobile device, where the conference utilizes resources provided by a conference bridge, includes receiving an identifier of the conference at the conference bridge. The identifier is sent from the conferencing application in response to activating a link in a conference invitation. The link is associated with a redirect message. In response to receiving the identifier, the method includes establishing the conference with the conferencing application via the mobile device.

In accordance with another embodiment of the invention, a non-transitory machine-readable medium having machine-executable instructions for joining a conference using a mobile device, where the conference utilizes resources provided by a conference bridge, includes instructions for receiving an invitation at the mobile device to join the conference, The invitation includes a link associated with the conference bridge and an identifier of the conference. The machine-executable instructions also include instructions for activating the link in the invitation, and instructions for sending the identifier of the conference from the mobile device to the conference bridge. The machine-executable instructions also include instructions for receiving a redirect message at the mobile device from the conference bridge. The redirect message is associated with a conferencing application on the mobile device and includes an access code for the conference. The machine-executable instructions also include instructions for launching the conferencing application on the mobile device in response to receiving the redirect message, and instructions for sending the access code from the mobile device to the conference bridge to establish the conference between the conference bridge and the conferencing application via the mobile device.

In accordance with yet another embodiment of the invention, a non-transitory machine-readable medium having machine-executable instructions for joining a conference using a mobile device, where the conference utilizes resources provided by a conference bridge, includes instructions for receiving an invitation at the mobile device to join the conference. The invitation includes a link having a redirect message. The redirect message is associated with a conferencing application on the mobile device and an identifier of the conference. The machine-executable instructions also include instructions for activating the link in the invitation, instructions for passing the redirect message from a web browser to an operating system running on the mobile device, instructions for launching the conferencing application on the mobile device, and instructions for providing the identifier of the conference to the conferencing application. The machine-executable instructions also include instructions for sending the identifier of the conference from the mobile device to the conference bridge, and instructions for establishing the conference between the conference bridge and the conferencing application via the mobile device.

Numerous benefits are achieved using embodiments of the present invention over conventional techniques. For example, some embodiments provide methods for joining a conference call (referred to herein generally as a conference) using a mobile device by selecting a link in a conference invitation. Selecting the link provides a conference ID and an access code to a conference bridge and provides means for launching a conferencing application on the mobile device and establishing the conference. This allows the participant to join the conference with minimal effort (potentially with a single click or selection). This also allows the participant to join the conference in a minimal amount of time (no calling-in and manually entering conference ID's and access codes). These benefits can improve conferencing services and enhance user experience. Depending on the embodiment, one or more of these benefits may exist. These and other benefits are described throughout the specification and more particularly below.

DETAILED DESCRIPTION

Embodiments of the present invention provide improved conferencing services and enhanced user experience by enabling participants to join conference calls with minimal time and effort when using a mobile device. Conference invitations are often received via an electronic message such as an email message. In some embodiments, a link within a conference invitation provides a means for accessing a conference bridge and providing information to the conference bridge such as a conference ID and an access code. The conference bridge may determine that the conference ID and access code were sent from a mobile device. The conference bridge may respond by sending a redirect message to the mobile device that provides a means for launching a conferencing application on the mobile device. The conference may be established between the conference bridge and the conferencing application. In other embodiments, the link within the conference invitation is associated with a redirect message and other information such as an identifier of the conference. The redirect message provides a means for launching the conferencing application on the mobile device. The conferencing application may instruct the mobile device to send information to the conference bridge to establish the conference. These embodiments enable participants to join conference calls merely by selecting a link in a conference invitation.

Figure 1:
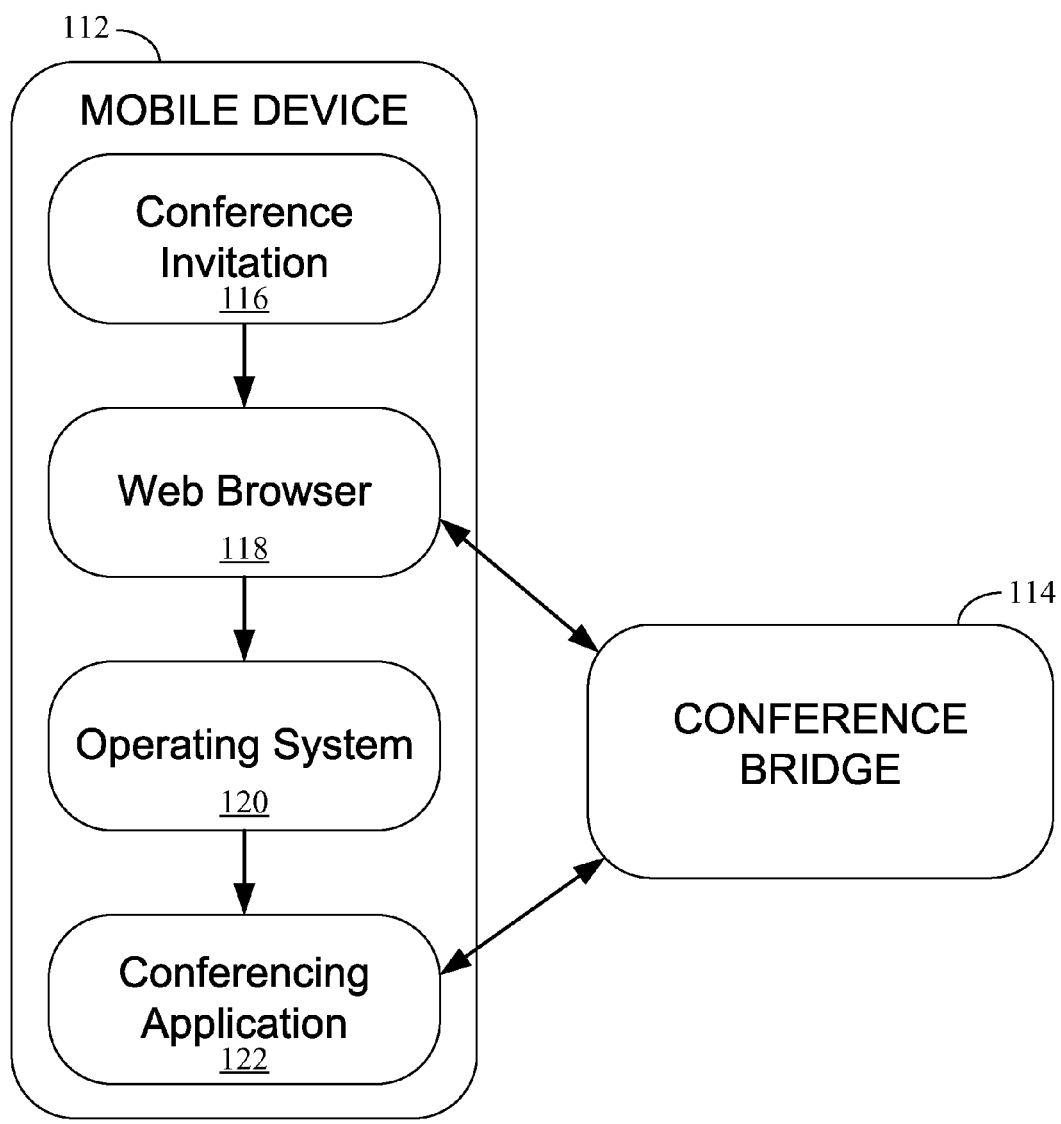
FIGS. 1-2 are simplified diagrams of a mobile device and a conference bridge and illustrate some of the communications that may occur when joining a conference using an embodiment of the invention.

FIG. 1 is a simplified diagram of a mobile device 112 and a conference bridge 114 and illustrates some of the communications that may occur when joining a conference using an embodiment of the invention. As explained more fully below, this embodiment allows a participant using a mobile device to join a conference by selecting a link in a conference invitation. It should be appreciated that the simplified diagrams used in this application are intended to provide an exemplary high-level configuration that includes the components necessary to describe and enable embodiments of the invention. It should also be appreciated that, in light of the present disclosure, embodiments of the invention may be used with systems having different configurations and/or different components. Further, the components illustrated may represent physical and/or functional components or groupings of components in actual systems.

The mobile device 112 may be a mobile phone (such as an Apple iPhone), a tablet computer (such as an Apple iPad), or a similar mobile communications device. The mobile device 112 may be configured to provide wireless audio, video, and/or data communications. The mobile device 112 may include typical components for mobile communications such as a processor, an RF module, RF amplifiers, an antenna, an input mechanism (e.g., a keypad or a touchscreen), a display, a microphone, a speaker, non-transitory memory, a battery, and the like. The mobile device 112 may also include typical software components such as an operating system and software-based applications.

As explained previously, the conference bridge 114 is a machine that links telephone calls and enables sharing of other resources. The conference bridge 114 may include typical computing components such as one or more processors, a network adapter, data ports, non-transitory memory, input and output devices, a system bus, and a power supply. Random-access memory (RAM) and disk drives are examples of non-transitory memory for storage of data and computer programs. Other types of non-transitory memory include magnetic storage memory, optical storage memory, semiconductor memories (e.g., flash memory), networked storage devices, and the like. The conference bridge 114 may also include typical software components such as an operating system and software-based applications.

The mobile device 112 is configured to receive a conference invitation 116. The conference invitation 116 may be received using conventional methods such as via an email message, a calendar event, a short message service (SMS) message, an instant messaging (IM) message, or the like. The conference invitation 116 includes a link that is associated with the conference bridge 114. The link may be a hyperlink, a uniform resource identifier, or the like. In some embodiments, the link may be associated with an Internet Protocol (IP) address of the conference bridge 114. In other embodiments, the link may include a domain name associated with the conference bridge 114. As an example, in an embodiment the link may be in the form of "https://conference.shoretel.com/29828," where conference.shoretel.com identifies a domain and 29828 identifies a conference hosted on a particular conference bridge.

The link may also be associated with an identifier of the conference. The identifier of the conference may include a conference ID, an access code for the conference, and/or other information related to the conference.

The link is typically activated in response to a user selecting (e.g., by clicking, tapping, etc.) the link using an input device. The link may also be activated in response to other user commands (e.g., entering a URI into a web browser). Activating the link launches a web browser 118 on the mobile device 112 (if not already launched) and accesses the conference bridge 114 associated with the link using known techniques. The web browser 118 may be any known mobile browser such as Safari, Opera, BOLT, Skyfire, Dolphin, or the like. The conference bridge 114 may be provided with a conference ID, an access code for the conference, and/or other information related to the conference and/or related to the mobile device 112. For example, information associated with the web browser 118 (e.g., type of web browser) and/or information associated with the mobile device 112 (e.g., type of mobile device) may be provided to the conference bridge 114 by a user agent header.

The conference bridge 114 may use the conference ID to identify the conference. This may include determining that the conference is valid, determining that a time window is open for a scheduled conference, and the like. The conference bridge 114 may uses the access code to identify the participant (e.g., host, scheduler, invitee, etc.) and to determine an access level or privileges that may be granted to the participant during the conference. The conference bridge 114 may also use other information, such as the type of web browser 118 or the type of mobile device 112, to determine that the mobile device 112 is a mobile communications device (or to determine that the conference ID was sent from a mobile communications device).

If the conference bridge 114 identifies and validates the conference and determines that the mobile device 112 is a mobile communications device, the conference bridge may send a redirect message to the mobile device 112 that is passed to the web browser 118. The redirect message may be, for example, a function used to direct a message from the web browser 118 to an operating system 120. The redirect message may identify or be associated with a conferencing application 122 on the mobile device 112, identify or be associated with the conference bridge, and/or provide information about the conference. The information may include a conference ID and/or an access code for the conference. In an embodiment, for example, the redirect message may be in the form of "ucbconf:\\ucb_address\conf_access_code," where ucbconf identifies the conferencing application 122 on the mobile device 112, ucb_address identifies the conference bridge 114, and conf_access_code identifies the conference ID and/or the access code.

The redirect message is provided from the web browser 118 to the operating system 120 because the web browser 118 is unable to recognize or interpret the redirect message. The redirect message is not in a form that is recognized by the protocol used by the web browser 118 (typically http, https, or the like). The operating system 120, on the other hand, is configured in accordance with known techniques to recognize the redirect message as being associated with the conferencing application 122. For example, a property list file may specify that the conferencing application 122 is associated with a particular uniform resource locator (URL) scheme.

In response to receiving the redirect message, the operating system 120 provides instructions to launch the conferencing application 122 and provides an identifier associated with the conference bridge 114 and an identifier of the conference to the conferencing application 122. The identifier of the conference may include the conference ID and/or an access code. The conferencing application 122 sends the identifier of the conference to the conference bridge 114 to establish the conference between the conference bridge 114 and the conferencing application 122 via the mobile device 112.

Figure 2:
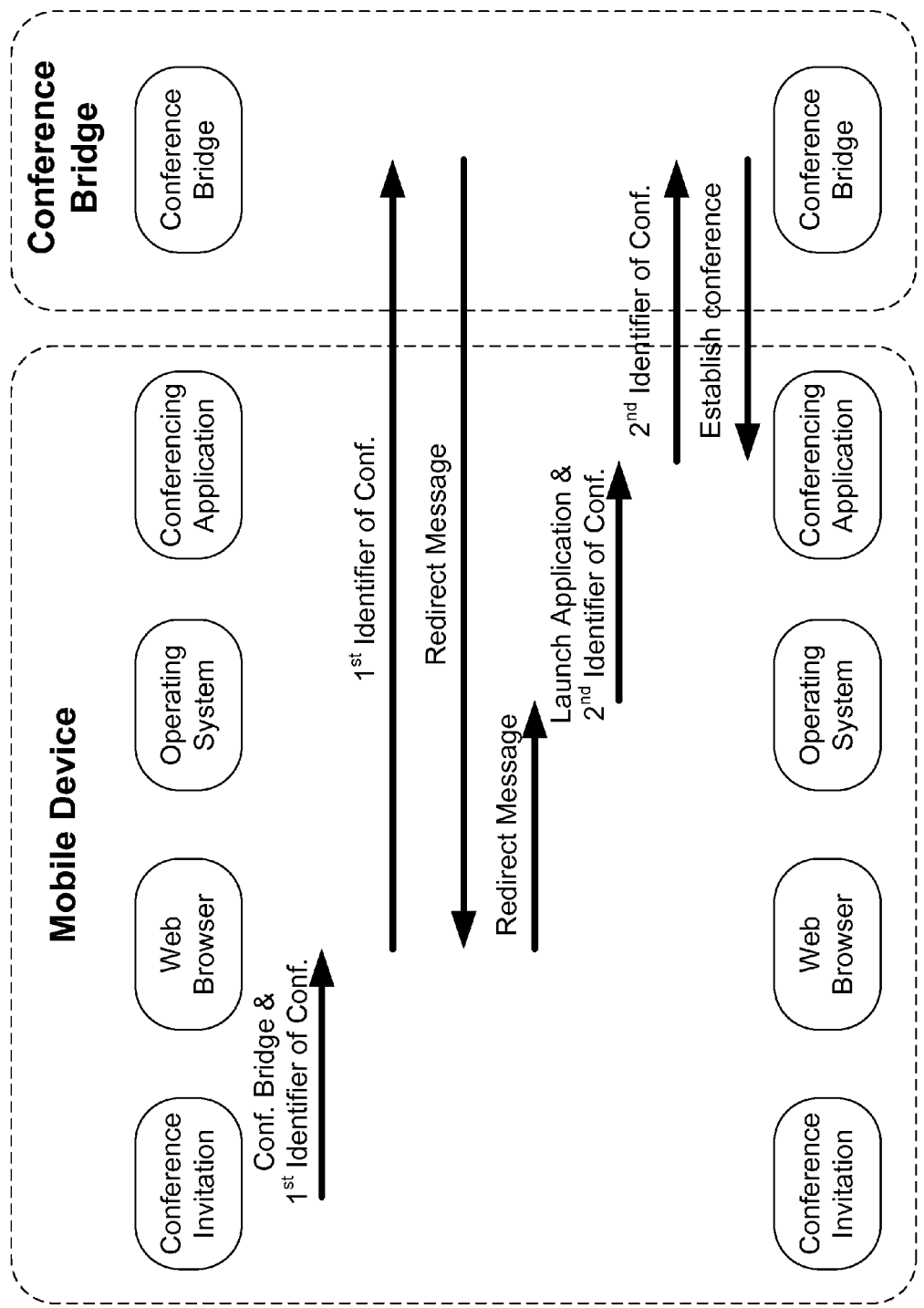

FIG. 2 is a simplified diagram illustrating some of the communications that may occur when joining a conference using an embodiment of the invention. The flow of the various communications illustrated in this embodiment starts with the uppermost horizontal line and proceeds downward. The various communications are similar to those discussed above with regard to FIG. 1.

The first communication illustrated in this embodiment is sending the Conf. Bridge and $1^{st}$ Identifier of Conf. from the Conference Invitation to the Web Browser. This communication occurs upon activation of a link in the Conference Invitation and may involve launching the Web Browser. The Conf. Bridge identifies (or is associated with) the conference bridge hosting the conference or setting up the conference. The $1^{st}$ Identifier of Conf. includes a conference ID, an access code, and/or other information related to the conference.

The next communication illustrated is sending the $1^{st}$ Identifier of Conf. from the Web Browser to the Conference Bridge. The Conference Bridge may use the $1^{st}$ Identifier of Conf. to identify the conference, identify the participant, and/or to determine if the Mobile Device is a mobile communications device.

The next communication illustrated is sending the Redirect Message from the Conference Bridge to the Web Browser. The redirect message may identify or be associated with the Conferencing Application on the Mobile Device and may provide information about the conference. The information may include an identifier associated with the conference bridge, an identifier associated with of the conference, an access code, and/or other related information.

The next communications illustrated are sending the Redirect Message from the Web Browser to the Operating System and, in response to receiving the Redirect Message, launching the Conferencing Application and providing a $2^{nd}$ Identifier of Conf. to the Conferencing Application. The $1^{st}$ Identifier of Conf. may include a conference ID, and the $2^{nd}$ Identifier of Conf. may include a participant access code.

The next communications illustrated are sending the $2^{nd}$ Identifier of Conf. from the Conferencing Application to the Conference Bridge and establishing the conference between the Conference Bridge and the Conferencing Application.

Figure 3:
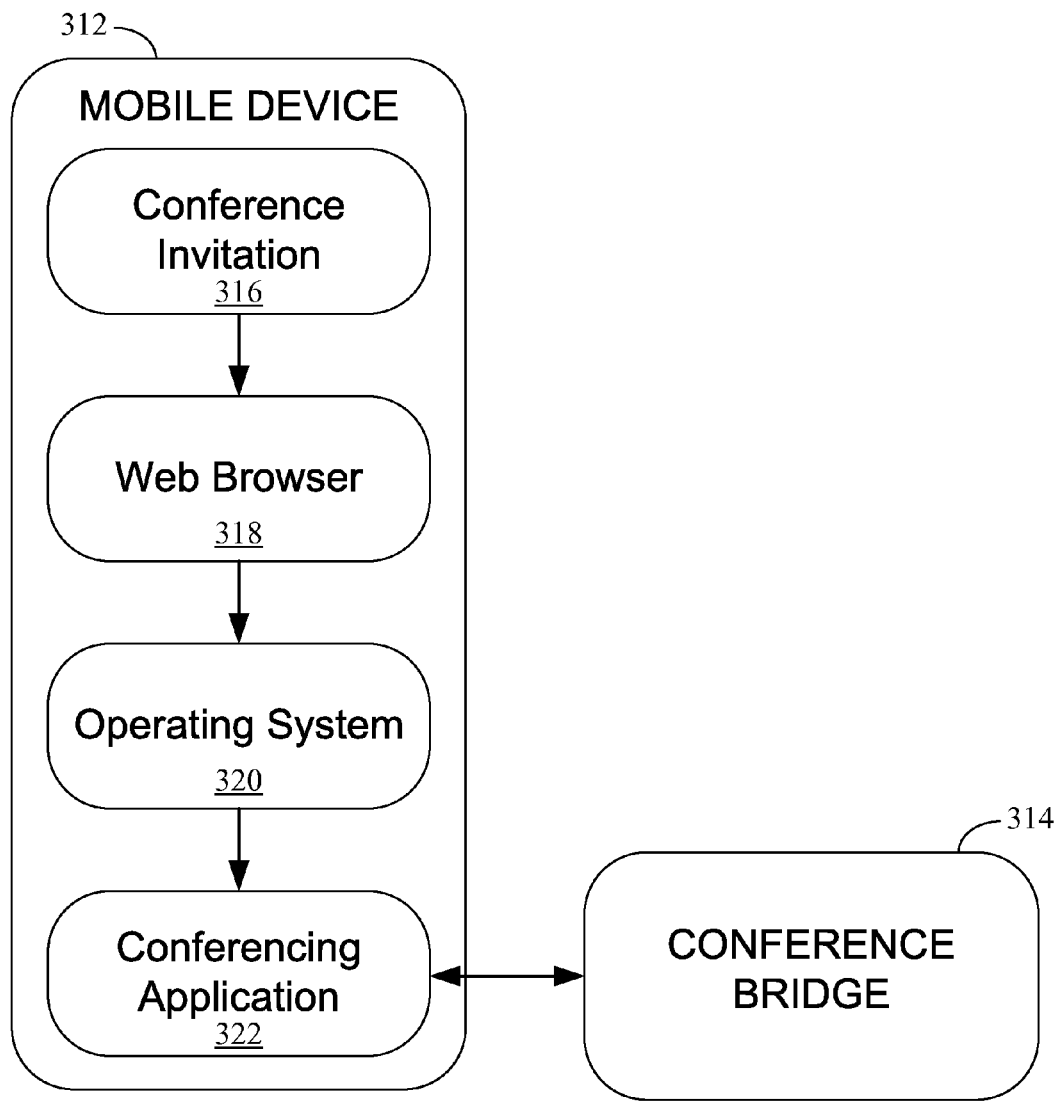
FIGS. 3-4 are simplified diagrams of a mobile device and a conference bridge and illustrate some of the communications that may occur when joining a conference using another embodiment of the invention.

FIG. 3 is a simplified diagram of a mobile device 312 and a conference bridge 314 and illustrates some of the communications that may occur when joining a conference using another embodiment of the invention. Like FIG. 1, this embodiment also allows a participant using a mobile device to join a conference by activating a link in a conference invitation. In this embodiment, however, communications between the mobile device 312 and the conference bridge 314 can be reduced.

The mobile device 312 is configured to receive a conference invitation 316. The conference invitation 316 includes a link similar to the conference invitation described above with regard to FIG. 1. In this embodiment, however, the link is associated with a redirect message. Similar to the embodiment described above with regard to FIG. 1, the redirect message may be a function used to direct a message from the web browser 318 to an operating system 320. The redirect message may identify or be associated with a conferencing application 322 on the mobile device 312 and may provide an identifier of the conference. The identifier of the conference may include an identifier associated with the conference bridge 314, a conference ID, an access code, and/or other related information.

The link may be activated in response to input from a user in accordance with conventional methods. Activating the link launches a web browser 318 on the mobile device 312 (if not already launched) and provides the redirect message to the web browser 318. As described above with regard to FIG. 1, the redirect message is passed from the web browser 318 to the operating system 320 because the web browser 318 is unable to recognize or interpret the redirect message. The operating system 320, on the other hand, is configured to recognize the redirect message as being associated with the conferencing application 322.

In response to receiving the redirect message, the operating system 320 provides instructions to launch the conferencing application 322 and provides the conferencing application 322 with the identifier of the conference. The conferencing application 322 sends the identifier of the conference to the conference bridge 314 to establish the conference between the conference bridge 314 and the conferencing application 322 via the mobile device 312.

Figure 4:
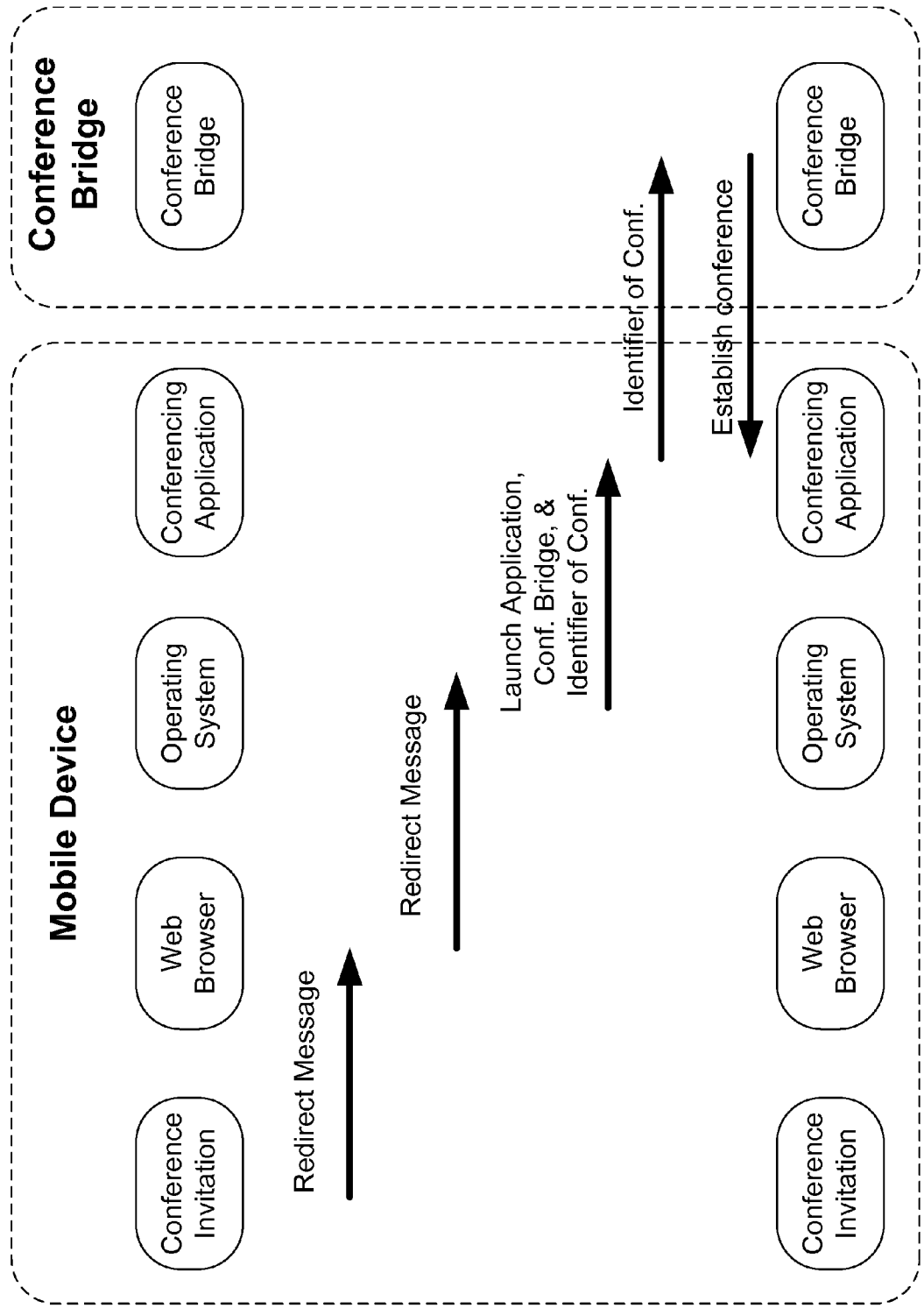

FIG. 4 is a simplified diagram illustrating some of the communications that may occur when joining a conference using another embodiment of the invention. The flow of the various communications illustrated in this embodiment starts with the uppermost horizontal line and proceeds downward. The various communications are similar to those discussed above with regard to FIG. 3.

The first communication illustrated in this embodiment is providing the Redirect Message to the Web Browser. This occurs upon activation of a link in the Conference Invitation and may involve launching the Web Browser. The Redirect Message may identify or be associated with the Conferencing Application on the Mobile Device and may provide an identifier of the conference. The identifier of the conference may include an identifier associated with the Conference Bridge, a conference ID, an access code, and/or other related information.

The next communications illustrated are passing the Redirect message from the Web Browser to the Operating System and, in response to receiving the Redirect Message, providing instructions to launch the Conferencing Application. The Operating System provides Conf. Bridge and Identifier of Conf. to the Conferencing Application. The Conf. Bridge identifies (or is associated with) the Conference Bridge. The Identifier of Conf. provides a conference ID, an access code, and/or other related information.

The next communications illustrated are sending the Identifier of Conf. from the Conferencing Application to the Conference Bridge and establishing the conference between the Conference Bridge and the Conferencing Application.

Figure 5:
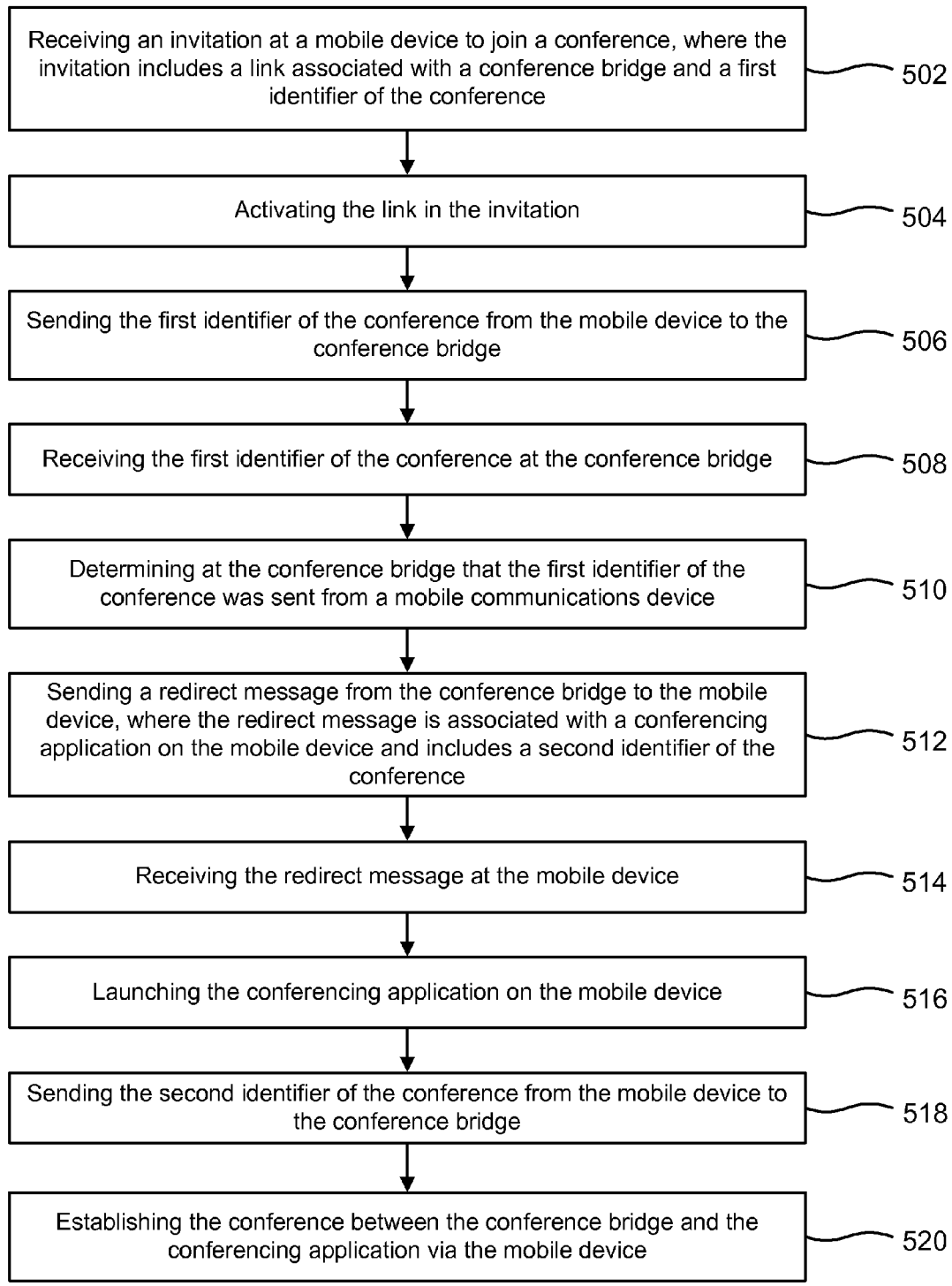
FIGS. 5-6 are simplified flowcharts providing methods for joining a conference using a mobile device in accordance with embodiments of the invention.

FIG. 5 is a simplified flowchart providing a method for joining a conference using a mobile device in accordance with an embodiment of the invention. The method includes receiving an invitation at the mobile device to join the conference, where the invitation includes a link associated with a conference bridge and a first identifier of the conference (502). The invitation is a conference invitation that may be received via an email message, a calendar event, a short message service (SMS) message, or an instant messaging (IM) message. The link may be a hyperlink or a uniform resource identifier. The first identifier of the conference may include an identifier associated with the conference bridge, a conference ID, an access code, and/or other related information.

The method also includes activating the link in the invitation (504). The link may be activated in accordance with known techniques. Activating the link may launch a web browser on the mobile device.

The method also includes sending the first identifier of the conference from the mobile device to the conference bridge (506) and receiving the first identifier of the conference at the conference bridge (508).

The method also includes determining at the conference bridge that the first identifier of the conference was sent from a mobile communications device (510). This determination is made using information provided with the first identifier of the conference and may be based on the type of browser or the type of mobile device sending the information.

The method also includes sending a redirect message from the conference bridge to the mobile device, where the redirect message is associated with a conferencing application on the mobile device and includes a second identifier of the conference (512). The second identifier of the conference may include an identifier associated with the conference bridge, a conference ID, an access code, and/or other related information.

The method also includes receiving the redirect message at the mobile device (514). The redirect message is received by the web browser and provided from the web browser to an operating system.

The method also includes launching the conferencing application on the mobile device (516). The operating system provides instructions to launch the conferencing application in response to receiving the redirect message.

The method also includes sending the second identifier of the conference from the mobile device to the conference bridge (518) and establishing the conference between the conference bridge and the conferencing application via the mobile device (520).

Figure 6:
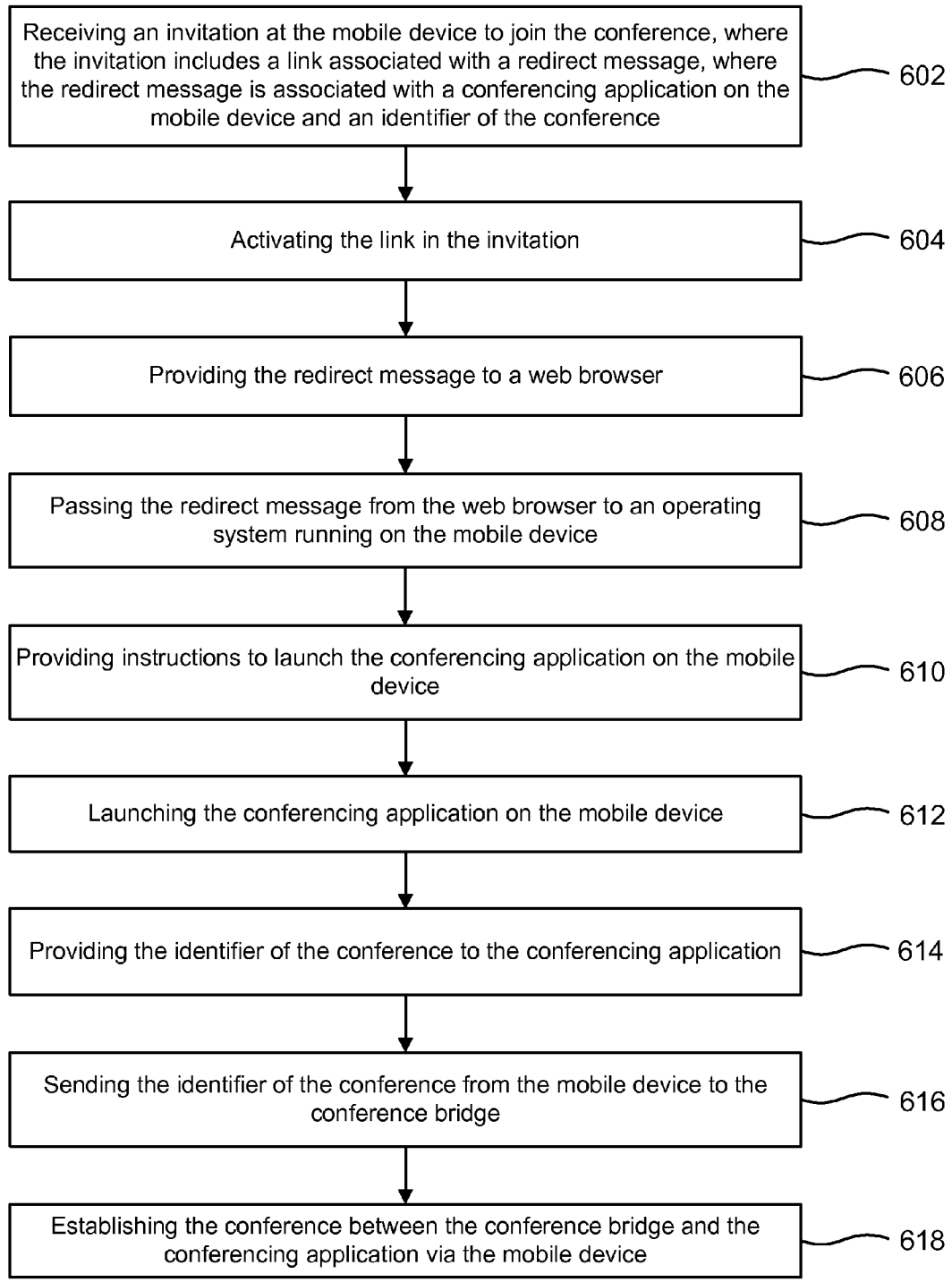

FIG. 6 is a simplified flowchart providing a method for joining a conference using a mobile device in accordance with another embodiment of the invention. The method includes receiving an invitation at the mobile device to join the conference, where the invitation includes a link associated with a redirect message, where the redirect message is associated with a conferencing application on the mobile device and an identifier of the conference (602). The invitation is a conference invitation that may be received via an email message, a calendar event, a short message service (SMS) message, or an instant messaging (IM) message. The link may be a hyperlink or a uniform resource identifier. The identifier of the conference may include an identifier associated with the conference bridge, a conference ID, an access code, and/or other related information.

The method also includes activating the link in the invitation (604) and providing the redirect message to a web browser (606). The link may be activated in accordance with known techniques. Activating the link may launch the web browser on the mobile device.

The method also includes passing the redirect message from the web browser to an operating system on the mobile device (608) and providing instructions to launch the conferencing application on the mobile device (610). The operating system provides the instructions in response to receiving the redirect message.

The method also includes launching the conferencing application on the mobile device (612) and providing the identifier of the conference to the conferencing application (614).

The method also includes sending the identifier of the conference from the mobile device to the conference bridge (616) and establishing the conference between the conference bridge and the conferencing application via the mobile device (618).

It should be appreciated that the specific steps illustrated in FIGS. 5-6 provide particular methods for joining a conference using a mobile device according to embodiments of the present invention. Other sequences of steps may also be performed according to alternative embodiments. For example, alternative embodiments may perform the steps outlined above in a different order. Moreover, the individual steps illustrated in FIGS. 5-6 may include multiple sub-steps that may be performed in various sequences as appropriate to the individual step. Furthermore, additional steps may be added or removed depending on the particular application.

It should be appreciated that some embodiments of the present invention may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may be adapted to perform the necessary tasks. The term "computer-readable medium" includes, but is not limited to, portable or fixed storage devices, optical storage devices, wireless channels, sim cards, other smart cards, and various other non-transitory mediums capable of storing, containing, or carrying instructions or data.

While the present invention has been described in terms of specific embodiments, it should be apparent to those skilled in the art that the scope of the present invention is not limited to the embodiments described herein. For example, features of one or more embodiments of the invention may be combined with one or more features of other embodiments without departing from the scope of the invention. The specification and drawings are, accordingly, to be regarded in an illustrative rather than a restrictive sense. Thus, the scope of the present invention should be determined not with reference to the above description, but should be determined with reference to the appended claims along with their full scope of equivalents.

What is claimed is:

1. A method for joining a conference using a mobile device, the conference utilizing resources provided by a conference bridge, the method comprising:
    receiving an invitation at the mobile device to join the conference, the invitation including a hyperlink associated with an Internet Protocol (IP) address of the conference bridge and an identifier of the conference;
    selecting the hyperlink in the invitation using an input device;
    in response to selecting the hyperlink, launching a web browser on the mobile device and sending the identifier of the conference from the mobile device to the conference bridge using the IP address;
    receiving the identifier of the conference at the conference bridge;
    determining at the conference bridge that the identifier of the conference was sent from a mobile communications device, the determination made using information from a user agent header;
    sending a redirect message from the conference bridge to the mobile device, the redirect message specifying a conferencing application on the mobile device and including an access code for the conference;
    receiving the redirect message at the mobile device;
    providing the redirect message to the web browser on the mobile device;
    providing the redirect message from the web browser to an operating system on the mobile device;
    launching the conferencing application on the mobile device in response to instructions from the operating system;
    providing the access code to the conferencing application;
    sending the access code from the conferencing application to the conference bridge using the mobile device; and
    establishing the conference between the conference bridge and the conferencing application via the mobile device.

2. A method for joining a conference using a mobile device, the conference utilizing resources provided by a conference bridge, the method comprising:
    receiving an invitation at the mobile device to join the conference, the invitation including a link associated with the conference bridge and a first identifier of the conference;
    activating the link in the invitation;
    in response to activating the link, sending the first identifier of the conference from the mobile device to the conference bridge;
    receiving the first identifier of the conference at the conference bridge;
    determining at the conference bridge that the first identifier of the conference was sent from a mobile communications device, the determination made using information from a user agent header;
    sending a redirect message from the conference bridge to the mobile device, the redirect message associated with a conferencing application on the mobile device and including a second identifier of the conference, the redirect message being in a form that is not recognizable by a web browser running on the mobile device but is recognizable by an operating system running on the mobile device;
    receiving the redirect message at the mobile device;
    in response to receiving the redirect message, launching the conferencing application on the mobile device;
    sending the second identifier of the conference from the mobile device to the conference bridge; and
    establishing the conference between the conference bridge and the conferencing application via the mobile device.

3. The method of claim 2 wherein the link is a hyperlink or a uniform resource identifier (URI).

4. The method of claim 2 wherein the mobile device is a tablet computer or a mobile phone.

5. The method of claim 2 further comprising launching a web browser on the mobile device in response to activating the link in the invitation, the web browser sending the first identifier of the conference to the conference bridge.

6. The method of claim 2 wherein the redirect message is received at the mobile device by the web browser and passed from the web browser to the operating system running on the mobile device, and the operating system provides instructions to launch the conferencing application on the mobile device.

7. The method of claim 2 wherein the first identifier of the conference includes a conference ID and the second identifier of the conference includes an access code.

8. A method for joining a conference using a mobile device, the conference utilizing resources provided by a conference bridge, the method comprising:
    receiving an invitation at the mobile device to join the conference, the invitation including a link associated with the conference bridge and a first identifier of the conference;
    activating the link in the invitation;
    sending the first identifier of the conference from the mobile device to the conference bridge;
    receiving a redirect message at the mobile device from the conference bridge, the redirect message associated with a conferencing application on the mobile device and including a second identifier of the conference, the redirect message being in a form that is not recognizable by a web browser running on the mobile device but is recognizable by an operating system running on the mobile device;

in response to receiving the redirect message, launching the conferencing application on the mobile device; and sending the second identifier of the conference from the mobile device to the conference bridge to establish the conference between the conference bridge and the conferencing application via the mobile device.

9. The method of claim 8 wherein the link is a hyperlink or a uniform resource identifier (URI).

10. The method of claim 8 wherein the mobile device is a tablet computer or a mobile phone.

11. The method of claim 8 wherein the mobile communications device is an Apple iPhone.

12. The method of claim 8 wherein the link includes an Internet Protocol (IP) address of the conference bridge or a domain name associated with the conference bridge.

13. The method of claim 8 wherein the first identifier of the conference includes a conference ID and the second identifier of the conference includes an access code.

14. The method of claim 8 further comprising launching a web browser on the mobile device in response to activating the link in the invitation, the web browser sending the first identifier of the conference to the conference bridge.

15. The method of claim 8 wherein the redirect message is received at the mobile device by the web browser and passed from the web browser to the operating system running on the mobile device, and the operating system provides instructions to launch the conferencing application on the mobile device.

16. The method of claim 8 wherein the invitation is received via at least one of an email message, a calendar event, a short message service (SMS) message, or an instant messaging (IM) message.

17. The method of claim 8 wherein the link is activated in response to user input received via an input device.

18. A method for establishing a conference using a conferencing application on a mobile device, the conference utilizing resources provided by a conference bridge, the method comprising:

receiving a first identifier of the conference at the conference bridge, the first identifier of the conference sent from the mobile device in response to activating a link in a conference invitation;

determining at the conference bridge that the first identifier of the conference was sent from a mobile communications device, the determination made using information from a user agent header;

sending a redirect message from the conference bridge to the mobile device, the redirect message associated with a conferencing application on the mobile device and including a second identifier of the conference, the redirect message being in a form that is not recognizable by a web browser running on the mobile device but is recognizable by an operating system running on the mobile device;

receiving the second identifier of the conference from the mobile device; and establishing the conference with the conferencing application via the mobile device.

19. The method of claim 18 wherein the mobile device is a tablet computer or a mobile phone.

20. The method of claim 18 wherein the first identifier of the conference includes a conference ID and the second identifier of the conference includes an access code.

21. A method for joining a conference using a mobile device, the conference utilizing resources provided by a conference bridge, the method comprising:

receiving an invitation at the mobile device to join the conference, the invitation including a link associated with a redirect message, the redirect message associated with a conferencing application on the mobile device and an identifier of the conference, the redirect message being in a form that is not recognizable by a web browser running on the mobile device but is recognizable by an operating system running on the mobile device;

activating the link in the invitation;

providing the redirect message to the web browser;

passing the redirect message from the web browser to the operating system running on the mobile device;

from the operating system, providing instructions to launch the conferencing application on the mobile device;

launching the conferencing application on the mobile device;

providing the identifier of the conference to the conferencing application;

sending the identifier of the conference from the mobile device to the conference bridge; and establishing the conference between the conference bridge and the conferencing application via the mobile device.

22. The method of claim 21 wherein the link is a hyperlink or a uniform resource identifier (URI).

23. The method of claim 21 wherein the identifier of the conference includes an identifier associated with the conference bridge, a conference ID, and an access code for the conference.

24. A method for establishing a conference with a conferencing application on a mobile device, the conference utilizing resources provided by a conference bridge, the method comprising:

receiving an identifier of the conference at the conference bridge, the identifier sent from the conferencing application in response to activating a link in a conference invitation, the link being associated with a redirect message, the redirect message being in a form that is not recognizable by a web browser running on the mobile device but is recognizable by an operating system running on the mobile device; and in response to receiving the identifier, establishing the conference with the conferencing application via the mobile device.

25. The method of claim 24 wherein the identifier of the conference includes an identifier associated with the conference bridge, a conference ID, and an access code for the conference.

* * * * *